Aug. 26, 1969   J. M. BRENNAN ET AL   3,463,547
FLEXIBLE CHAIR SEAT
Filed Oct. 20, 1967
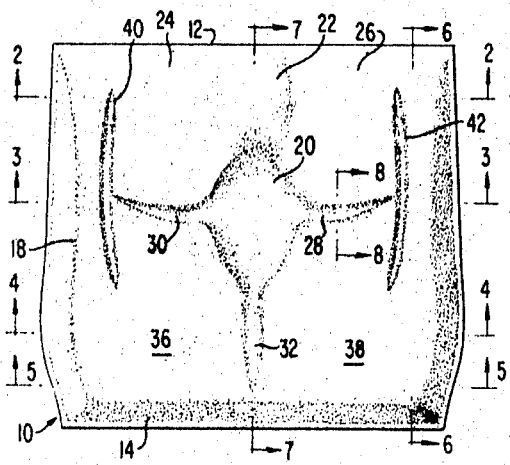
FIG. 1
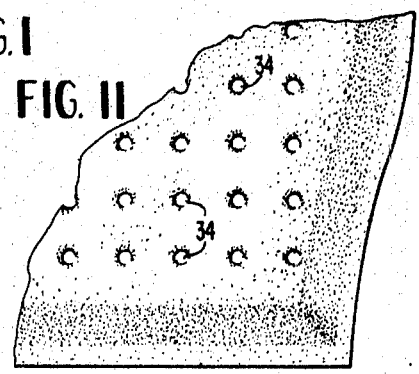
FIG. 11
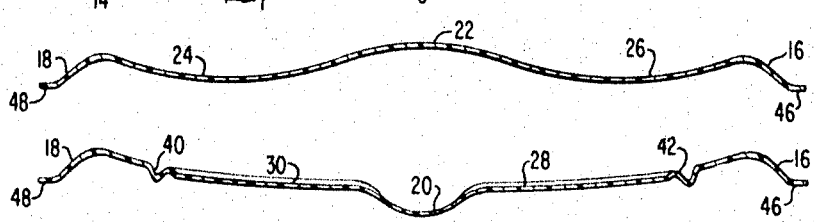
FIG. 2
FIG. 3
FIG. 4
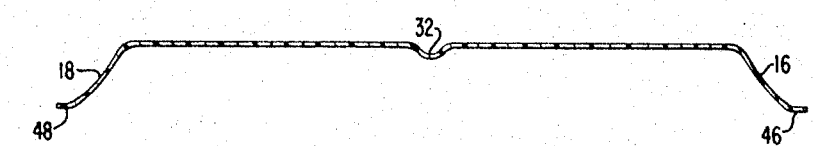
FIG. 5
FIG. 6
FIG. 7
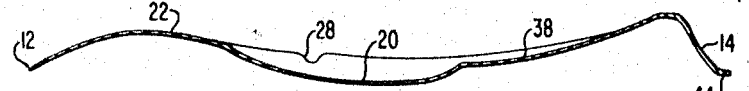
FIG. 8
FIG. 9
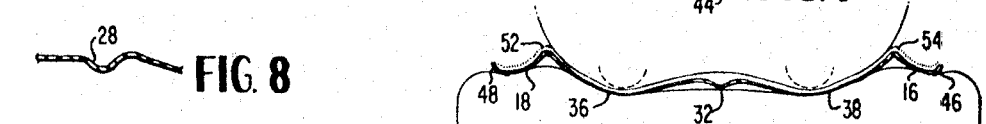
FIG. 10
INVENTORS
JOHN M. BRENNAN
HAROLD R. SPARKS
Kenon, Palmer + Estabrook
ATTORNEY

United States Patent Office 3,463,547
Patented Aug. 26, 1969

3,463,547
FLEXIBLE CHAIR SEAT
John M. Brennan, 2535 E. Van Buren, Phoenix, Ariz. 85034, and Harold R. Sparks, 3751 E. Meadowbrook Ave., Phoenix, Ariz. 85018
Filed Oct. 20, 1967, Ser. No. 676,857
Int. Cl. A47c 7/02
U.S. Cl. 297—459     10 Claims

ABSTRACT OF THE DISCLOSURE

A unitary, flexible, plastic member for use with seats of chairs or the like and which is provided with a modified anatomical series of contours and portions with varying degrees of flexibility is described in the hereinafter specification. The member may be used as a saddle or readily adapted to use as a pad that may be placed on a relatively soft cushioned seat such as an automobile seat. In lieu of being used as a pad or the like it may be incorporated as the topmost portion of the seat of a cushioned chair or the like. The member is so constructed that it admits of varying degrees of flexibility so that it tends to conform to the natural shape of a user. It is provided with channels and ridges and other portions of varying degrees of thickness such that the weight of the user is evenly distributed across the entire member.

BACKGROUND OF THE INVENTION

Field of the invention

This invention relates to chair seats, removable seat pads, cushions and the like and it is the purpose of the invention to provide a more efficient device for enhancing the comfort of persons such as motor vehicle operators, desk workers, and the like who are required to sit in a more or less fixed position for relatively long periods of time.

Description of the prior art

Soft cushioning materials have long been used in the construction of chairs, seats, and the like in that such materials have a capacity for conforming to the shape of the human body. Such materials tend, when used for short periods of time, to distribute contact pressure between the user and the seat over a greater area than hard seats. Nevertheless, seats made out of soft cushioning materials become objectionable when used for long periods of time. For example the bottoms of the user's thighs tend to flatten out resulting in increased contact pressures which causes a flattening or pinching of the leg arteries and veins thus impeding blood circulation. Such soft materials tend to bunch or gather in the midpelvic area of the occupant of the seat and in so collecting they usually cause considerable discomfort. Finally the user's ischium tubers extend deeper into a soft cushioned chair or the like than do other poritons of his anatomy, this increases localized contact pressures thereby causing discomfort to the occupant of the chair.

SUMMARY OF THE INVENTION

Accordingly the herein disclosed invention comprises an article of manufacture for use with seats and the like that is capable of evenly supporting the weight of a user of the seat and thereby generally eliminate localized areas of high contact pressure and the accompanying discomforts.

It is an object of this invention to provide a new and novel seat member for use with soft cushion seats that is constructed so as to support the posterior anatomy of a user of the seat in its normally relaxed shape.

It is an object of this invention to provide a new and novel seat member of thin, plastic material having varying degrees of thickness and flexibility.

It is a further object of this invention to provide a new and novel flexible seat member that permits of relatively inexpensive manufacturing techniques.

A still further object is to provide a unitary thin flexible plastic seat member configured in such a manner as to readily permit the circulation of air in the contact area of the seat to make the use of same more pleasant and enjoyable.

These and other objects of the invention will become apparent upon a reading of the hereinafter described preferred embodiment of the invention taken in conjunction with the drawing in which:

FIGURE 1 is a plan view of a plastic saddle made in accordance with the present invention;

FIGURE 2 is a sectional view taken on the line 2—2 of FIGURE 1;

FIGURE 3 is a sectional view taken on the line 3—3 of FIGURE 1;

FIGURE 4 is a sectional view taken on the line 4—4 of FIGURE 1;

FIGURE 5 is a sectional view taken on the line 5—5 of FIGURE 1;

FIGURE 6 is a sectional view taken on the line 6—6 of FIGURE 1;

FIGURE 7 is a sectional view taken on the line 7—7 of FIGURE 1;

FIGURE 8 is a sectional view taken on the line 8—8 of FIGURE 1;

FIGURE 9 is a rear elevational view showing the saddle of this invention placed on the top of a soft cushion such as a car seat;

FIGURE 10 is an elevational view showing the seat of this invention incorporated as an integral part of a cushioned chair; and FIGURE 11 is a view of a portion of the bottom of the seat shown in FIGURE 1.

Referring now to FIGURE 1, in one embodiment of this invention the seat comprises a saddle 10 adapted to be placed on top of the seat portion of a chair or bench seat employing a soft cushion. The saddle is a generally planar surface of molded or otherwise formed plastic material as may be seen in FIGURES 1 through 8. It is provided with a front edge 12, a back edge 14, and two side edges 16 and 18. The surface of the saddle is formed with a centrally located depression or cavity 20 of generally oval shape to accommodate the private parts of the user of the seat. The cavity 20 is made just thick enough so that it will not collapse or break yet it will adequately restrain the bulging up of the soft cushioning material underlying the planar surface of the saddle. In this respect it is aided by the concave shape of the cavity or depression 20. The oval shape of the cavity 20 furnishes extra space for bunched or gathered clothing and sufficient space for the private parts of the sitter so that it aids in the prevention of the buildup of uncomfortable pressure at this location.

The saddle 10 has extending from the cavity 20 a centrally located ridge 22 of generally oval configuration which terminates at the front edge 12. The saddle is shaped on either side of the ridge 22, as is best seen in FIGURE 2, with slightly concave portions 24 and 26 for receiving the legs or thighs of the sitter. The ridge 22 tends to hold the legs of the sitter slightly apart, and thus cooperates with the concave regions or portions 24 and 26 to support the thigh muscles of the sitter in their normally round and thus relaxed configuration. The particular curvilinear shape of the saddle 10 defined by the portions 22, 24, and 26, which may be best seen in FIGURE 2, results in a uniform distribution of contact pressure between the front portion of the saddle and the legs and thighs of the occupant. It is because of this configuration that the occupant's thighs are held in their normally relaxed shape whereby flattening of the arteries and veins in the occupant's leg is avoided. A particular advantage is achieved in that the occupant's blood circulation is generally not obstructed by pinching of the arteries and veins over extended periods of use.

Referring now to FIGURES 1, 3 and 8 a pair of channels or corrugations 28 and 30 may be seen to radiate from the central depression 20 in the direction of the side edges 16 and 18 respectively. A third channel or corrugation 32 radiates from the cavity 20 in the direction of the back edge 14. The saddle is shaped such that it is slightly concave in regions 36 and 38 respectively, which are located between the channels 28 and 30 and the rear edge 14 on either side of the channel 32, as may be best seen in FIGURES 1 and 4. These regions are designed to support buttocks of the user and to this end these portions or areas of the saddle are constructed so that they are thinner in cross section than the saddle proper. The regions 36 and 38 will directly support the sitter's ischium tubers and because these regions are thinner, in cross section, the saddle will under pressure yield or flex to a greater extent in the vicinity of these regions than in other areas. The channels 28 and 30 allow the saddle to stretch or expand in the fore and aft directions when pressure is applied to the regions 24, 26, 36, and 38. Since the greatest force is usually exerted on the regions 36 and 38 the greatest stretching action is within these latter two regions. The channels 28 and 30 thus provide additional material when the saddle is in compression thereby allowing the saddle to adapt itself to various sizes and shapes. In normal use, as an occupant sinks into the saddle the more rigid portions take up some of the contact pressure thereby reducing the said pressure in the area of the ischium tubers. It is because of the shape and thickness of the regions 36 and 38 that contact pressure is more evenly distributed over the entire contact surface; that portion of the sitter's anatomy that is in contact with the saddle is as may be seen generally supported in its natural relaxed shape.

The channels 28, 30, and 32 also provide means for air circulation between the user and the upper surface of the saddle and in addition vent holes 34, FIGURE 11, may also be provided in the saddle. The number of vent holes will usually be determined by the lateral and longitudinal dimensions of the saddle and they must be of such a size and number as to not change the structural integrity, i.e., supporting features, of the saddle. They are provided for the passage or flow of air through and over the surface 10 thus promoting cooling and relieving perspiration and the consequent tendency for the occupant's clothing to stick to the saddle.

As may be seen in FIGURES 1 and 3 of the drawings, two fore and aft channels or corrugations 40 and 42 are located on either side of the central cavity 20 at the outer ends of the channels 28 and 30. These channels tend to facilitate a bending action of the saddle along their lengthwise dimension resulting in a body wrapping action being produced along the sides of the saddle or seat. As a direct result of the wrapping action more of the body weight of the user is supported along the sides 16 and 18 of the seat. In addition, the corrugations 40 and 42 yield some elongation in a lateral direction, thus further promoting the ability of the surface 10 to conform to diverse shapes. Since the corrugations 40 and 42 tend to flatten out, they yield additional material for various sized occupants and the the same time the stretching action strengthens the saddle against bending along a lateral midline approximated by the channels 28 and 30. Obviously, more than one pair of corrugations 40 and 42 may be employed.

Referring to FIGURE 9 in particular, when the sheet 10 is to be employed as a saddle or as a generally planar member superimposed upon a soft cushioned seat 50, the construction is such that the back edge 14 and the side edges 16 and 18 comprise generally downwardly extending walls which terminate in horizontally extending flanges 44, 46 and 48, respectively. The said flanges are provided to prevent rocking and rotational movement of the saddle when a user initially attempts to seat himself. Such movement could occur, in the absence of the edge flanges, around a pivot point established by the cavity 20, however the flanges are designed to take up a major portion of the contact with the cushion; thus any tendency of the saddle to rock and rotate in a horizontal plane is minimized. In addition, the side walls of the edges 14, 16 and 18 are thinner in cross section than the average thickness for the entire member 10, and they may be thinner than their respective flanges. This construction allows the side walls to easily deflect under the pressure exerted by the occupants of the seat, thus the surface 10 does not tend to elevate the occupant vertically relative to the vertical position he would have been supported in by the soft cushion alone.

The saddle is preferably made out of plastic materials and may be used as shown, but for aesthetic and comfort reasons it may be covered with a cloth material of the upholstery type. A covered saddle shown generally in FIGURES 9 and 10 is a laminated article of manufacture comprising the plastic surface 10 upon which is superposed a shaped pad 52 of either foam rubber or foam plastic and a layer of upholstery covering material 54 which may be of cloth or plastic. Generally speaking the sponge or cushioning pad 52 should not fill the depression 20 in order that the depth of the cavity may be maximized. The upholstery material is covered over the depression 20 but sufficient material is used in order that it conforms to the shape of the cavity.

As shown in FIGURE 10 a modified version of the saddle 10 is built as a composite portion of a chair 56. The back edge 14 and the side edges 16 and 18 of the overlay product may be dispensed with in this version and replaced by downwardly extending flanges 58 and 60. A similar flange may be utilized for the back portion of the saddle. This alternate forms of construction may be used as the seat portion of aircraft seats, railway seats, automotive bucket seats, and the like. The actual form and cross sectional views with the exception of the downwardly extending sides and back are exactly the same as shown in FIGURE 1 of the drawings. For an article of this type, the chair cushion 62 is normally made of foam rubber, foam plastic, or other similar cushioning material. It is molded to match the bottom surface of the saddle 10, or in the manufacture of the seat the cushion 62 could be molded against the bottom surface of the saddle 10 in order that it adhere to and exactly match the contours of the saddle 10. The cushion 62 may be mounted in any conventional manner adopted by the furniture industry.

While the present invention has been shown and described as a saddle or support for a single person or occupant such as a driver of an automobile it is quite obvious that a saddle could be made to extend entirely across an automobile bench seat and be readily adaptable to the use of more than one occupant. In such a case the saddle shown in FIGURE 1 would be duplicated as to depressions, ridges, corrugations and the like for the several passengers' portion of the bench seat.

Although the foregoing description is necessarily of a detailed character, in order that the invention may be completely set forth, it is to be understood that the specific terminology is not intended to be restrictive or confining, and that various rearrangements of parts and modifications of detail may be resorted to .

We claim:

1. A seat comprising a flexible, generally planar member having a front edge, side edges and a back edge, said member being provided with a centrally disposed cavity and two regions of shallow concavity and of thinner cross section than said member located adjacent to and on either side of said cavity and extending in the direction of said back edge, said region having greater flexibility than said member.

2. A seat according to claim 1 wherein said member is provided with at least one channel extending from the vicinity of said cavity towards said side edges.

3. A seat according to claim 2 wherein said seat is provided with a fore and aft channel extending from said cavity in the direction of said back edge.

4. A seat according to claim 1 wherein said member is provided with a generally oval shaped ridge extending between said cavity and said front edge and wherein said member is provided with concave regions on either side of said ridge.

5. A seat according to claim 1 wherein said member is provided with at least a pair of fore and aft channels located on either side of said centrally disposed cavity.

6. A seat according to claim 1 wherein each of said side edges comprises a wall extending downwardly from said member and terminating in a horizontally extending flange.

7. A seat according to claim 6 wherein each of said side walls is thinner in cross section than the average thickness of said seat.

8. A seat according to claim 1 wherein said back edge comprises a wall extending downwardly from said member that terminates in a horizontally extending flange.

9. A seat according to claim 8 wherein the downwardly extending wall of said back edge is thinner in cross section than the average thickness of said seat.

10. An anatomically contoured saddle adapted to be used as a seat overlay comprising a flexible, generally planar member provided with at least two side walls that extend downwardly from said member and a back edge, said member being provided with a centrally disposed cavity, a centrally disposed channel extending in the direction of said side walls, and two regions of greater flexibility than said member located between said channel and said back edge.

References Cited

UNITED STATES PATENTS

| | | | |
|---|---|---|---|
| 2,488,728 | 11/1949 | Kopplin. | |
| 3,061,374 | 10/1962 | Grosfillex | 297—230 |
| 3,138,404 | 6/1964 | Newton | 297—230 |
| 3,177,036 | 4/1965 | Halter | 297—459 X |
| 3,253,860 | 5/1966 | Shapiro | 297—458 X |
| 3,376,070 | 4/1968 | Johnson | 297—459 |
| 3,389,936 | 6/1968 | Drabort | 297—458 X |
| 3,393,012 | 7/1968 | Chancellor | 297—458 |

CASMIR A. NUNBERG, Primary Examiner

U.S. Cl. X.R.

297—452